United States Patent [19]
Foellmi

[11] Patent Number: 6,074,564
[45] Date of Patent: Jun. 13, 2000

[54] OZONE INJECTION SYSTEM

[75] Inventor: Steven N. Foellmi, Lake Forest, Calif.

[73] Assignee: Black & Veatch, L.L.P., Kansas City, Mo.

[21] Appl. No.: 09/057,882

[22] Filed: Apr. 9, 1998

[51] Int. Cl.$^7$ ....................................................... C02F 1/78
[52] U.S. Cl. ........................... 210/760; 210/192; 210/199; 261/23.1; 261/75
[58] Field of Search ................... 210/192, 198.1, 210/199, 760; 261/23.1, 75

[56] References Cited

U.S. PATENT DOCUMENTS

| | | | |
|---|---|---|---|
| 4,252,654 | 2/1981 | Leitzke et al. | 210/760 |
| 4,255,257 | 3/1981 | Greiner et al. | 210/760 |
| 5,004,537 | 4/1991 | Brown . | |
| 5,015,394 | 5/1991 | McElhenney et al. . | |
| 5,061,377 | 10/1991 | Lee et al. | 210/760 |
| 5,075,016 | 12/1991 | Barnes . | |
| 5,106,497 | 4/1992 | Finnegan . | |
| 5,174,905 | 12/1992 | Shaw . | |
| 5,186,841 | 2/1993 | Schick . | |
| 5,190,648 | 3/1993 | Ramsauer . | |
| 5,494,589 | 2/1996 | Moorehead et al. . | |
| 5,514,284 | 5/1996 | Uban et al. . | |

*Primary Examiner*—David A. Simmons
*Assistant Examiner*—Betsy J. Morrison
*Attorney, Agent, or Firm*—John C. McMahon

[57] ABSTRACT

An apparatus for injecting ozone into water includes a riser leg, a down leg and a plurality of crossovers joining the riser and down legs. A partial side stream of water from a main under substantial hydraulic pressure is directed through the apparatus. A crossover is chosen in accordance with the hydraulic head pressure of the side stream such that the water flowing therethrough is at a substantially lower pressure than the water in the main. A source of ozone is connected by a manifold and valving to allow the ozone to be injected into the water in the selected crossover. After injection of ozone, the side stream is returned to the water main to allow mixing of the ozone containing water with the remainder of the water in the main. A pump is also alternatively used to provide additional head pressure to the water in the side stream where head losses cannot be overcome by diverting to a lower crossover.

13 Claims, 1 Drawing Sheet

OZONE INJECTION SYSTEM

BACKGROUND OF THE INVENTION

The present invention relates to an apparatus and method for injecting ozone into a pressurized water stream in a water main wherein water pressure in the main varies with respect to time. The apparatus and method separate a portion of the main water stream into a side stream and direct the side stream through a loop having a plurality of vertically spaced crossovers. Flow is directed through a particular crossover that is selected in accordance with the pressure of the water. Ozone is injected under reduced pressure into the top of the loop.

In many locations fresh water supplies are stored in reservoirs that may be natural lakes or formed behind dams along rivers and the like. Such water is transferred, often utilizing hydraulic forces created by the depth of the water in a reservoir, under pressure through piping to users in a city or the like. Normally, such water is treated in some manner to disinfect the water. A common disinfecting technique is to inject ozone into the water to kill microorganisms in the water.

While modern technology makes it relatively easy to produce ozone from either pure oxygen or from air, there are problems associated with use of such ozone in water systems that are derived from reservoirs of the type noted above. In particular, the ozone must somehow be injected into the water stream in order for it to disinfect the water. Water is normally drawn off of a reservoir from a comparatively low region of the reservoir so that the reservoir may be essentially drained, if need be. Because of this, there is normally a fairly substantial hydraulic pressure associated with the water, since the normal level in a reservoir is kept substantially above the empty level.

There may be several hundred feet or more of water above the location where the water is withdrawn from the reservoir. While this hydraulic pressure may be effectively used to transport the water to the city where the water is used, it creates a substantial back pressure which must be overcome, if ozone is to be injected into the water. To inject ozone at high pressures, comparatively large oxygen/ozone gas compressors are required that must be constructed of suitable materials that are able to withstand contact with ozone on a continuous basis. When such compressors are required to produce relatively high pressures, they are comparatively very expensive to construct, operate and maintain. Such compressors are also comparatively very noisy.

While high pressure oxygen/ozone compressors are very expensive and limited in availability, oxygen supply and ozone generator equipment systems are readily available with the capability to produce ozone at a pressure of at least fifteen pounds per square inch gauge (psig) for injection directly into a relatively low pressure water system without the use of large oxygen/ozone gas compressors. The readily available low pressure systems must still be constructed to withstand ozone, but are in comparison substantially less expensive to construct and operate and substantially less noisy than systems using oxygen/ozone gas compressors that are designed to inject the same amount of ozone into water with a much higher back pressure.

Therefore, it became important with respect to the present invention to construct equipment and design methods which allow injection of ozone into water at a comparatively low pressure even though the source of the water has a relatively high hydraulic pressure. It is also important with respect to the present invention that the overall cost of the equipment necessary to allow injection of ozone at a lower pressure not be so costly as to offset the short term and long term savings produced by injecting the ozone at a comparatively lower pressure.

SUMMARY OF THE INVENTION

The present invention is directed to an apparatus and method for allowing the injection of a gas, especially containing ozone, into a liquid, such as water, to be mixed with the gas and wherein the liquid is initially under a substantial hydraulic pressure and the main supply of the liquid remains under the relatively high pressure. Preferably, the apparatus and method provide for the injection of ozone into a fresh water supply so as to disinfect the water and make the water suitable for potable use.

The apparatus and method allow injection of the ozone into at least a portion of the water in a side stream at substantially less pressure than the normal hydraulic pressure of the water in a water main, after which the water containing the gas is conveyed back to the main water flow and mixed therewith.

The apparatus of the present invention includes a piping system that has a riser leg, a down leg and a plurality of vertically spaced crossovers which join the riser leg and the down leg. Each of the crossovers has associated therewith a valve that allows an operator to control water flow through each crossover, such that the operator can channel all water flow through a single selected crossover and shut off flow to the remaining crossovers. The riser leg and down leg are both flow connected with the water main which is in turn preferably connected to a water reservoir such that water within the main is under a substantial hydraulic pressure, for example, forty pounds per square inch gauge or more and at least greater than fifteen pounds per square inch. The apparatus further includes an oxygen/ozone gas manifold which is connected at one end to an ozone generator system and which includes a plurality of opposite ends that are flow connected with respective crossovers. Valves are provided on the gas manifold to allow flow of the ozone through the manifold to a selected one of the crossovers.

The crossovers are vertically spaced from one another at, for example, twelve to fifteen feet intervals, such that injection of oxygen/ozone at a desired lower pressure can be continuously achieved regardless of the actual hydraulic pressure in the water main.

During operation of the apparatus and in accordance with the present method, water is allowed to flow out of the reservoir and into the water main at a relatively high pressure. A side stream of the water flows up the riser leg and across one of the crossovers after which the water flows into the down leg and is returned to the water main. In the water main the side stream that is passed through the crossover mixes with the remainder of the water in the main by direct mixing and/or by means of a contactor.

During passage through the crossover, the water mixes with an ozone carrying gas which is conveyed to the crossover by the gas manifold from the ozone generator. The gas mixes with the side stream in the crossover and subsequently with the remainder of the water after the side stream returns to the main. The crossover selected to carry the side stream is normally the one fairly close in vertical height but underneath the water surface height of the reservoir. In this manner the head pressure from the reservoir will normally cause the water to flow up the riser leg. However, there are frictional losses within the liquid piping system and there are head losses due to the injection of gas into the water. A substantial reduction in head pressure results from the change in density of the water in the riser leg compared to the down leg due to injection of gas in the crossover. Consequently, the selected crossover leg may by necessity have to be one which is lower than the crossover next beneath the surface of the reservoir.

In some situations, it is foreseen that the hydraulic losses in the liquid pipe system may be sufficient to require additional pumping. This is provided by a pump which may in some situations be simply on standby and in other situations necessary for adding some additional head to the liquid entering the riser leg, especially when the water level in the reservoir is very low. Such a pump may be located in either the inlet or the outlet end of the sidestream.

Furthermore, it is foreseen in certain embodiments of the invention, a pump may be utilized in conjunction with a loop having a single crossover and a pressure control device such as a relief valve within the riser leg before the injection of the ozone so as to reduce the pressure in the riser leg to a sufficiently low enough pressure to allow injection of the ozone at substantially less pressure than is found in the water main.

OBJECTS AND ADVANTAGES OF THE INVENTION

Therefore, the objects of the present invention are: to provide an apparatus for injecting a gas containing ozone into water taken from a main at a substantially lower pressure than is found in the main; to provide such an apparatus including a liquid piping system that joins with the water main and has a loop that includes at least one crossover which is substantially vertically spaced from the main and that is joined with a source of ozone so that ozone gas may be injected into the crossover at a reduced pressure compared to the main pressure; to provide such an apparatus including a plurality of vertically spaced crossovers joined with a riser leg and a down leg of the liquid piping system and with each crossover including a valve to allow selective usage of the crossover; to provide such an apparatus wherein ozone is conveyed through a gas manifold that is connected to each of the crossovers to allow selective flow of the ozone into any of the crossovers upon selection of that particular crossover; to provide such an apparatus including mixers to mix the ozone water mixture subsequent to entry of the ozone into the water and contactors to increase the residence time of the ozone in contact with the water to provide for disinfection of the water by the ozone; to provide such an apparatus including a pump joined with the riser leg that may be selectively used to increase head pressure within the riser leg in certain operating situations; to provide a method of injecting ozone as a gas into water to be disinfected by the ozone wherein the water is under a substantial hydraulic head pressure by reduction of the head pressure due to passage of a side stream of water through the liquid apparatus described above; to provide such a method wherein a selected crossover through which the water flows normally is vertically positioned beneath the top of the water in the reservoir from which the water is being drawn and is selected to provide the least amount of back pressure at the point of injection of the ozone above the head pressure required to produce water flow through the side stream; to provide such a method wherein different crossovers are selected during different operating levels of the reservoir to maintain the pressure required to inject ozone into the liquid side stream at a minimum; to provide such a method in the alternative wherein a device is utilized to reduce the pressure in a loop having at least one crossover so as to allow injection of the ozone into a crossover side stream at a generally continuous pressure; and to provide such an apparatus which is relatively inexpensive to operate in comparison to the apparatus required to inject ozone into the water main at the water pressure found at the water main, relatively easy to operate and that does not require full time crewing at the site of the apparatus.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
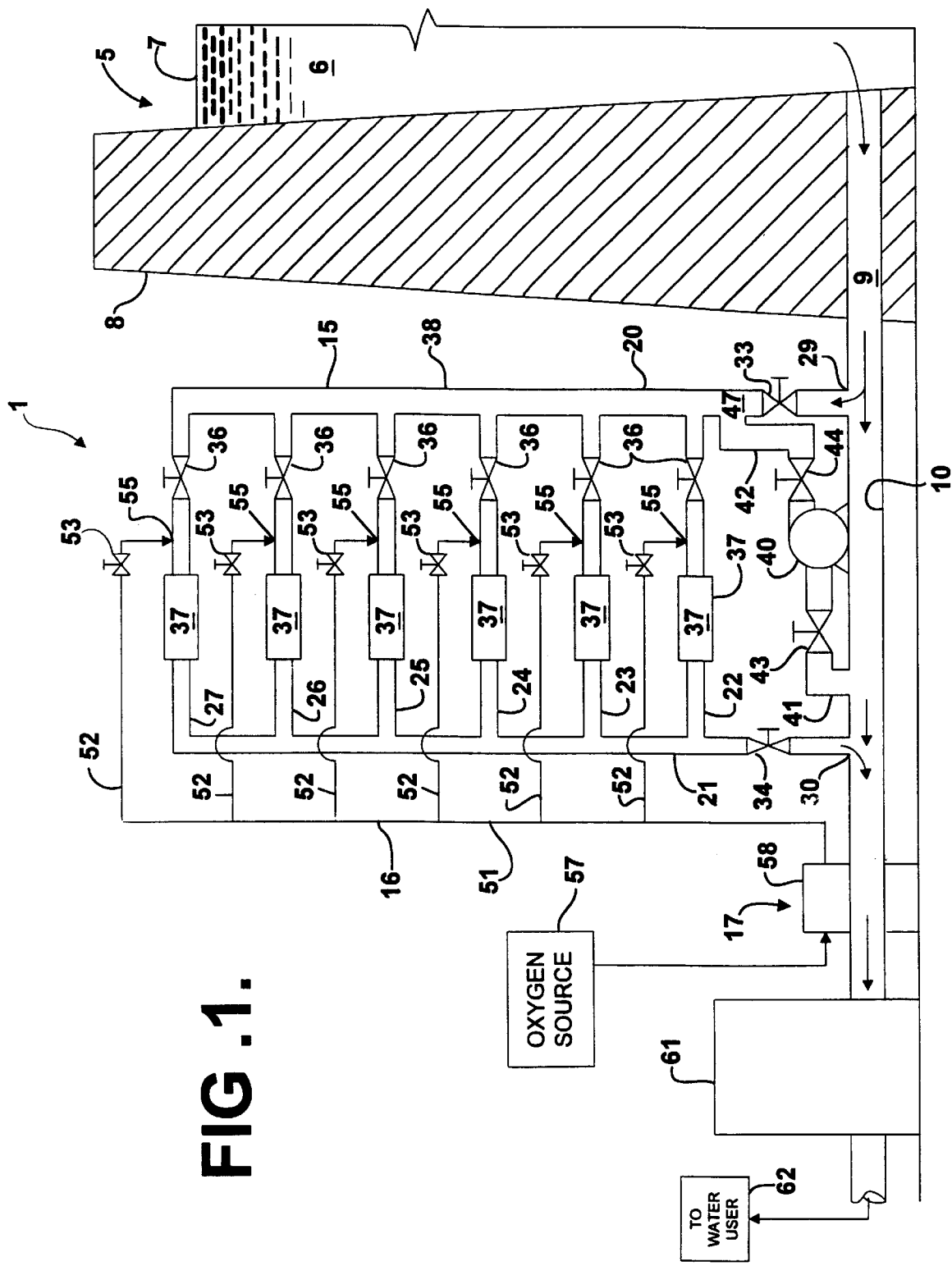
FIG. 1 is a partially schematic and side elevational view of an apparatus for injecting ozone into a water stream in accordance with the present invention wherein size of certain parts is not proportionate to other parts to better illustrate the invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents an apparatus for injecting a gas containing ozone into water in accordance with the present invention.

In the illustrated embodiments seen in FIG. 1, a reservoir 5 containing water 6 with an upper water surface 7 is maintained behind a dam 8. The dam 8 and reservoir 5 may be of a substantial variety of possible constructions and it is possible in some situations for the reservoir to not even require a dam, but simply be a depression located in the mountains or rolling terrain. It is foreseen that the invention of the present invention may be utilized in any combination of water delivery components that result in a pressurized water main.

Please note that FIG. 1 is not to scale and that certain elements of FIG. 1 are enlarged compared to the remainder of the figure in order to better illustrate certain portions of the invention. Typically, water 6 is withdrawn from the reservoir 5 at a location 11 (vertical level) that is substantially vertically spaced beneath the water surface 7, resulting in a significant hydraulic water pressure in the water main 10.

In the present embodiment a water main 10 withdraws main water 9 from the reservoir 5 near the bottom thereof. Normally, the water main 10 includes some type of valving or gateing (not shown) to control flow of water from the reservoir 5.

The apparatus 1 includes a branched water pipe system 15, a gas pipe manifold 16 and an ozone source 17.

The water pipe system 15 has a riser leg 20, a down leg 21 and a plurality of crossovers 22 through 27. The riser leg 20 is flow connected with the water main 10 at a juncture 29 and the down leg 21 is flow connected with the water main 10 at juncture 30. The riser leg 20 includes a control valve 33 and the down leg 21 also includes a control valve 34 allowing stoppage of flow through the water pipe system 15 for repair and the like. Each of the crossovers 22 through 27 include a flow control valve 36 to allow an operator to selectively direct flow through a selected one of the crossovers 22 through 27. Each of the crossovers 22 through 27 also includes a mixing device 37 to provide mixing of water and gas passing therethrough. The riser leg 20, down leg 21 and a related crossover, such as crossover 26, form a vertically configured loop 38 through which water may flow.

The illustrated apparatus 1 also includes a pump 40 flow connected by piping segments 41 and 42 to the water main 10 and the riser leg 20 respectively. Each of the piping segments 41 and 42 also have therealong control valves 43 and 44 respectively to allow diversion of water 9 from the main channel alternatively either through the pump 40 or when the valves 43 and 44 are shut through the valve 33. In this manner the pump 40 may be utilized, only when needed, to apply additional head pressure to a water side stream 47 passing into the riser leg 20.

The gas pipe manifold 16 includes a header 51 that diverges into a plurality of branches 52, such that there is one branch 52 for each crossover 22 through 27. Each of the gas manifold branches 52 include a control valve 53 for controlling flow of gas therethrough. Each of the branches 52 flow join with a crossover either 22 through 27 at respective junctures 55 located upstream of respective static mixers 37 associated with the particular crossover 22 through 27.

In the illustrated embodiment, all of the valves 53 associated with the branches 52 are shut except for the valve associated with the branch 52 that joins with the crossover 26 that has been selected to remain open.

Therefore, the side stream 47 flows up the riser leg 20, through the crossover 26 and down the down leg 21 to return to the water main 10. Likewise the valve 53 associated with the branch 52 that joins with the crossover 26 is also open. The upstream end of the header 51 is flow connected with the ozone source 17.

The ozone can be derived from any conventional ozone generating system. In particular, the ozone source 17 includes an oxygen source 57 that supplies oxygen to and flow communicates with an ozone generator 58 of conventional type. The oxygen source 57 may either be ambient air in which case a greater amount of gas is injected into the side stream 47 or may be taken from a compressed or liquid oxygen source. The oxygen from the oxygen source 57 passes through the ozone generator 58. The oxygen source 57 also pressurizes the oxygen either through compressors, drawing the oxygen from a compound source or the like.

In passing through the ozone generator 58, the oxygen is normally exposed to a high voltage electrical discharge which converts a portion of the oxygen contained in the gas to ozone. It is foreseen that the volume percentage of ozone in the gas mixture may vary depending on the type and efficiency of the gas generator 58. In a particular embodiment of the invention, the percentage of ozone in the gas is approximately 10% by volume of gas flow when using pure oxygen or approximately 3% by volume when using air as the oxygen source. The ozone percentage may also vary with the particular circumstances of the process. The ozone will typically flow through the generator as a result of gas pressure normally associated with the oxygen source 57 produced by the compressor 58 and consistent with efficient ozone generation. Subsequent to the generation of ozone, the gas is pressurized at a pressure which will allow the gas to be injected into the crossovers 22 through 27 at the location of injection 55 associated therewith. Under the present invention it is preferred that the gas injection pressure in the sidestream 47 be less than 15 pounds per square inch gauge, but greater pressures may occur for some systems.

Once the side stream 47 discharges from the down leg 21, the side stream 47 due to gravity flow in the down leg 21 joins with the water 9 in the water main 10 and continues down stream to a contactor 61. It is foreseen that the contactor 61 may be a wide range of various types and designs of contactors and preferably has a circuitous pathway therethrough that is suitable for receiving a water-ozone mixture. It is also foreseen that the contractor may be a pressurized conduit of suitable size and length. The purpose of the contactor 61 is to allow residence time for the contents of the side stream 47 to mix with the remaining volume of water in the main water flow 9 in the water main 10, while also allowing the ozone additional time to react with infectious agents within the water and to thereby disinfect the water. After the water 9 has passed through the contactor 61 it is conveyed by piping not shown to the water end user identified by the reference numeral 62.

During operation of the apparatus 1, water 9 is continuously or intermittently withdrawn through the water main 10 from the reservoir 5. A side stream 47 from the water main 10 is diverted through the riser leg 20 by opening the valves 33 and 34 partially closing the water main valve 63 so as to create a differential system hydraulic head. Alternatively, the side stream 47 may also be diverted into the riser leg 20 by closing the valve 33 and opening the valves 43 and 44 with operation of the pump 40 so as to produce somewhat additional head within the side stream 47.

Although the pump 40 requires a certain amount of energy and expense to operate, this cost is substantially less than the differential cost to purchase and operate a large oxygen/ozone gas compressor as compared to a small compressor. The pump 40 also makes substantially less noise than would be the case with a large oxygen/ozone gas compressor.

Furthermore during operation, one of the crossovers 22 through 27 is open for flow of the side stream 47, while the others are closed by operation of the valves 36. The particular crossover 22 through 27 which is selected for passage of the side stream 47 is selected due to its position relative to the reservoir's surface 7. Normally, the best crossover 22 through 27 for operation of the apparatus 1 will be the next one located vertically beneath the surface 7 of the water 6 of the reservoir 5. In the particular case illustrated in FIG. 1, this is crossover 26.

Consequently, flow of the side stream 47 is illustrated as passing through the crossover 26. Under certain conditions and due to substantial head loss because of friction in the piping, mixer, valves, etc, the selected crossover may be one or more lower than the one illustrated in this particular embodiment. It is noted that head loss can be reduced by increasing pipe size in the side stream loop; however, for cost reasons this is not always practical. Normally, additional head loss can be compensated by diverting to a lower crossover 23 through 27; however, when the reservoir level 7 gets near the bottom thereof, this is not possible and the pump 40 is required to make up any additionally required head pressure.

For many installations the maximum ozone concentration in the water main to kill various infective agents such as Cryptosporidium, Giardia and the like is typically on the order of between two and five milligrams per liter. In a preferred embodiment the ozone concentration in the gas in header 51 is approximately 10% by volume of the total gas flow passing through the ozone generator-compressor 58 when the oxygen source is pure oxygen or 3% by volume when the oxygen source is air. As an example, when the ozone source is oxygen, the side stream 47 requires approximately fifty milligrams of the gas to be injected per liter of total water to be treated in the main 9.

The injection of the gas into the water at the injection point 55 substantially reduces the density of the side stream 47 in the remainder of the crossover 26 and in the down leg 21, as compared to the riser leg 20. The total reduction in density depends on the amount of the overall flow through the main 10 that is diverted through the riser leg 20 as the side stream 47. For example, where approximately 10% by volume of the water in the main 10 is diverted as the side stream, the density will be much less in the down leg 21 than when 15% of the flow through the main 10 is diverted as the side stream 47. Nevertheless, there is a cost associated with increasing the size of piping and in certain situations this may be either offset by use of the pump 40 to provide additional head in the riser leg 20 or by lowering the crossover through which the water passes to one that is further below the reservoir surface 7. Consequently, the pump 40 may be necessary to add additional head to the water due to frictional losses and density change and/or will almost assuredly be necessary to provide enough head for the side stream 47 when the water level 7 nears the bottom of the reservoir 5.

Each installation will vary somewhat due to circumstances surrounding the location and depth of the reservoir and other pertinent criteria. It is foreseen that the crossovers 22 through 27 will often be spaced approximately twelve to fifteen feet apart. Because the reservoir water surface 7 will vary in height, the back pressure will vary continuously in the selected crossover 22 through 27 at the point of injection 55, but by careful selection of which crossover 22 through 27 is being utilized at any one time, this back pressure can be maintained at a suitable level to enable efficient ozone production and gas flow with a relatively small compressor and generator, for example 15 pounds per square inch gauge or less, although this will depend upon the particular installation involved. This savings will vary dramatically with the typical variance in height of the surface of the reservoir 7; however, the apparatus 1 results in substantial savings in most instances.

It is preferred that the pipe size of the pipe in the apparatus 1 be such that the water velocity in the down leg 21 be at least in the range from 4.6 to 4.9 meters per second to assure plug flow of the water-gas mixtures therein and to prevent formation of gas pockets. Overall contact time of ozone with infectious material in the sidestream 47 varies over various installations based upon specific requirements for each installation, but normally the contact residence time is in the range from 6 to 15 seconds to assure inactivation of Giardia.

It is foreseen that a pressure relief valve could be alternatively installed in the piping segment 42 down stream of the pump 40. In such an installation, it is foreseen that only a single one of the crossovers 22 through 27 may typically be utilized, although more may be utilized in certain situations. In such an installation, the pressure relief valve would control the water pressure of the water at the base 57 of a riser leg such that the pressure in the side stream passing through an associated crossover would be constant and relatively low in comparison to the water head pressure in the water main and that ozone could be injected into the crossover at a substantially lower pressure than would be required to inject ozone into the water main.

It is to be understood that while certain forms of the present invention have been illustrated and described herein, it is not to be limited to the specific forms or arrangement of parts described and shown.

What is claimed is:

1. An apparatus for injecting a gas into a pressurized liquid wherein the pressurized liquid is taken from a liquid main and wherein a head pressure associated with the liquid in the liquid main varies over time; said apparatus comprising:
    a) a liquid piping system flow connected to said liquid main and having a riser leg, a down leg and a plurality of crossovers with each crossover selectively flow connecting said riser leg with said down leg; said liquid piping system operably receiving a side stream of liquid from the liquid main; each of said crossovers including a flow control valve mechanism to allow flow of said liquid side stream through a selected one of said crossovers while preventing flow through a remainder of said crossovers; and
    b) a gas manifold having a plurality of branches with each branch conveying said fluid to a respective one of said crossovers; each of said gas manifold branches including a control valve to allow selective flow of said fluid into said liquid at said selected one of said crossovers, such that said gas is injectable into said liquid at an injection pressure substantially lower than said head pressure.

2. The apparatus according to claim 1 wherein:
    a) said apparatus operably receives water as the liquid and gas including ozone as the fluid; and including
    b) an ozone generator fluid flow connected to said gas manifold.

3. The apparatus according to claim 2 including:
    a) said liquid main operably receives water from a source having a variable head pressure over a working height; and
    b) said crossovers being arranged in spaced intervals throughout said working height with a maximum height such that said selected one of said crossovers is generally vertically positioned next under said maximum height.

4. The apparatus according to claim 1 including: a) an oxygen supply source flow connected to an ozone generator and to said gas manifold to operably supply pressurize gas to said gas manifold.

5. The apparatus according to claim 1 including:
    a) each of said crossovers being vertically spaced relative to each other such that said selected one of the crossovers is the one of said crossovers that is vertically beneath the height of water in the riser leg.

6. The apparatus according to claim 1 including:
    a) each crossover having a mixer downstream of the location whereat said gas is injected into said liquid so as to operably mix the gas and the liquid.

7. The apparatus according to claim 1 including:
    a) a liquid main with said downcomer leg being flow connected to said liquid main; and
    b) a contactor flow connected with said liquid main subsequent to said liquid main joining with said downcomer leg.

8. The apparatus according to claim 1 in conjunction with a dam and reservoir wherein said reservoir is the source for the liquid and said liquid main draws water from a lower region of said reservoir.

9. An apparatus for injecting an ozone containing gas into water taken from a water main under a first pressure; said apparatus comprising:
  a) a liquid piping system having a riser leg, a down leg and a plurality of crossovers flow connecting said riser leg with said down leg; each of said crossovers being vertically spaced from one another and each including a respective crossover valve to selectively control flow of liquid therethrough during use;
  b) a gas manifold including a plurality of branches with each branch flow connecting with a respective one of said crossovers and each branch having a respective branch valve for controlling flow therethrough; and
  c) an ozone source operably producing ozone and delivering the ozone to said branches; each of said crossovers being operably selectable to receive a side stream flow of water from the water main and have ozone injected into the side stream from said ozone source.

10. The apparatus according to claim 9 including:
  a) an oxygen compressor system to compress an oxygen and ozone gas mixture in said manifold.

11. An apparatus for injecting ozone into water from a water main wherein the water in the main is under a comparatively high pressure comprising:
  a) a side stream fluid flow piping loop having a riser leg, a crossover and a down leg; said crossover flow connecting said riser leg and said down leg;
  b) a pressure relief valve located in said riser leg and operably maintaining the water pressure in said crossover at a substantially constant pressure that is comparatively much less than the high pressure of the water in the water main; and
  c) an ozone producing source operably flow connected to said crossover and operably injecting ozone into water in said crossover.

12. A method of injecting ozone into water comprising the steps of:
  a) diverting at least a partial side stream of a main water stream under a first pressure through an apparatus having a raised flow path; said raised flow path having branches located at different heights with valving to control flow through said branches;
  b) producing an ozone containing gas stream;
  c) selecting a branch and flowing the side stream through said branch by operation of said valving and injecting said gas stream into said side stream while said side stream is in said selected branch and at a second pressure that is substantially less than said first pressure; and
  d) returning said side stream to said main water stream.

13. An apparatus for injecting a gas into a pressurized liquid wherein the pressurized liquid is taken from a liquid main and wherein a head pressure associated with the liquid in the liquid main varies over time; said apparatus comprising:
  a) a liquid piping system flow connected to said liquid main and having a riser leg, a down leg and a plurality of crossovers with each crossover selectively flow connecting said riser leg with said down leg; said liquid piping system being adapted to receive a side stream of liquid from the liquid main; each of said crossovers including a flow control valve mechanism to allow flow of said liquid side stream through a selected one of said crossovers while preventing flow through a remainder of said crossovers;
  b) a gas manifold having a plurality of branches with each branch conveying said fluid to a respective one of said crossovers; each of said gas manifold branches including a control valve to allow selective flow of said fluid into said liquid at said selected one of said crossovers, such that said gas is injectable into said liquid at an injection pressure substantially lower than said head pressure; and
  c) a liquid pump selectively flow connectable to said riser leg to operably increase liquid pressure in said riser leg.

\* \* \* \* \*